(12) United States Patent
McKeen

(10) Patent No.: US 7,871,684 B2
(45) Date of Patent: *Jan. 18, 2011

(54) COATED PIPES FOR CONVEYING OIL

(75) Inventor: Laurence Waino McKeen, Sewell, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/500,140

(22) Filed: Jul. 9, 2009

(65) Prior Publication Data

US 2009/0266437 A1    Oct. 29, 2009

Related U.S. Application Data

(60) Division of application No. 11/169,343, filed on Jun. 29, 2005, now Pat. No. 7,575,789, which is a continuation-in-part of application No. 11/013,903, filed on Dec. 16, 2004, now abandoned.

(60) Provisional application No. 60/530,296, filed on Dec. 17, 2003, provisional application No. 60/581,421, filed on Jun. 21, 2004.

(51) Int. Cl.
F16L 9/00 (2006.01)
F16L 9/02 (2006.01)
F16L 9/147 (2006.01)

(52) U.S. Cl. .................. 428/36.9; 428/36.91; 138/140; 138/145; 138/146; 138/141; 138/DIG. 3; 138/DIG. 6; 285/45; 285/55

(58) Field of Classification Search ............... 428/36.9; 138/140, 145, 146, DIG. 3, DIG. 6
See application file for complete search history.

(56) References Cited

U.S. PATENT DOCUMENTS

| | | | |
|---|---|---|---|
| 2,562,117 A * | 7/1951 | Osdal | 148/251 |
| 2,562,118 A * | 7/1951 | Osdal | 148/251 |
| 2,613,193 A * | 10/1952 | Osdal | 524/269 |
| 2,685,707 A | 8/1954 | Llewellyn et al. | |
| 2,833,686 A | 5/1958 | Sandt | |
| 2,833,866 A | 5/1958 | Esser | |
| 3,087,827 A | 4/1963 | Klenke et al. | |
| 3,087,828 A | 4/1963 | Linton | |
| 3,087,829 A | 4/1963 | Linton | |
| 3,356,108 A | 12/1967 | Johnston | |
| 3,462,825 A * | 8/1969 | Pope et al. | 29/451 |
| 3,676,566 A | 7/1972 | McBride | |
| 3,970,627 A | 7/1976 | Seymus | |
| 4,252,859 A | 2/1981 | Concannon et al. | |
| 4,380,618 A | 4/1983 | Khan et al. | |
| 4,743,658 A | 5/1988 | Imbalzano et al. | |
| 4,846,264 A * | 7/1989 | Hata | 165/104.27 |
| 4,914,158 A * | 4/1990 | Yoshimura et al. | 525/199 |
| 4,943,489 A * | 7/1990 | Kuhara et al. | 428/586 |
| 5,198,053 A | 3/1993 | Duncan | |
| 5,216,067 A * | 6/1993 | Yamada et al. | 524/520 |
| 5,356,665 A | 10/1994 | Seki et al. | |
| 5,376,307 A | 12/1994 | Hagiwara et al. | |
| 5,434,001 A | 7/1995 | Yamada et al. | |
| 5,454,149 A * | 10/1995 | Buggle et al. | 29/33 P |
| 5,454,419 A | 10/1995 | Vloedman | |
| 5,566,984 A | 10/1996 | Abbema et al. | |
| 5,626,907 A | 5/1997 | Hagiwara et al. | |
| 5,670,010 A | 9/1997 | Hagiwara et al. | |
| 5,726,247 A | 3/1998 | Michalczyk et al. | |
| 5,867,883 A | 2/1999 | Iorio et al. | |
| 5,879,746 A * | 3/1999 | Tomihashi et al. | 427/379 |
| 5,879,804 A * | 3/1999 | Tsubuku | 428/402 |
| 5,932,673 A | 8/1999 | Aten et al. | |
| 5,972,494 A | 10/1999 | Janssens | |
| RE36,362 E * | 11/1999 | Jackson | 166/369 |
| 6,232,372 B1 | 5/2001 | Brothers et al. | |
| 6,397,895 B1 | 6/2002 | Lively | |
| 6,505,649 B1 | 1/2003 | Dixon-Roche | |
| 6,518,349 B1 | 2/2003 | Felix et al. | |
| 6,523,615 B2 * | 2/2003 | Gandy et al. | 166/381 |
| 6,632,902 B2 | 10/2003 | Lahijani | |
| 7,347,258 B2 | 3/2008 | McKeen | |
| 2002/0104575 A1 | 8/2002 | Nishi et al. | |
| 2003/0207057 A1 | 11/2003 | Britto et al. | |
| 2004/0138367 A1* | 7/2004 | Lahijani | 524/439 |
| 2005/0016610 A1 | 1/2005 | Lahijani | |
| 2005/0173012 A1 | 8/2005 | McKeen | |

(Continued)

FOREIGN PATENT DOCUMENTS

CA    1241262    3/1988

(Continued)

OTHER PUBLICATIONS

RD263060, "Lining of Pipe", Author: Anonymous, Research Disclosure, Mar. 1986, 263.

(Continued)

*Primary Examiner*—Rena L Dye
*Assistant Examiner*—Michele Jacobson

(57) ABSTRACT

The present invention relates to an oil pipe having a lining imparting substantially reduced adhesion of asphaltenes, paraffin wax, and inorganic scale, so as to reduce plugging of said oil pipe, and impermeability to salt water so as to protect the oil pipe from corrosion.

4 Claims, No Drawings

U.S. PATENT DOCUMENTS

| | | |
|---|---|---|
| 2005/0229992 A1 | 10/2005 | McKeen et al. |
| 2006/0127622 A1 | 6/2006 | Mohan et al. |
| 2006/0137757 A1 | 6/2006 | McKeen et al. |
| 2007/0089797 A1 | 4/2007 | Farnsworth |
| 2007/0095473 A1 | 5/2007 | Farnsworth et al. |
| 2007/0141285 A1 | 6/2007 | Lahijani |

FOREIGN PATENT DOCUMENTS

| | | |
|---|---|---|
| EP | 0190092 | 3/1989 |
| EP | 0226668 B1 | 1/1992 |
| JP | 550733741 | 6/1980 |
| JP | 11-227046 | 8/1999 |
| JP | 2001121606 A | 5/2001 |
| WO | 99/32820 | 7/1999 |

OTHER PUBLICATIONS

"Deepstar IIA Project—Paraffin Prevention by Coatings", DSIIA CTR A906-1, vol. 1, Apr. 1996.

JRV Supplement, Fall 1997, vol. 15, No. 3.

Impreglon—SR Metal Projection LTD: Online Newsletters, www.impreglon.com.

"Environmentally Friendly Fluoropolymer Coatings for Oil Field Applications", NACE Corrosion 2003 (Paper 03146), by Brian Willis, www.nac.org.

Pradip R. Khaladkar, "Fluoropolymers for Chemical Handling Applications", "Modern Fluoropolymers", Edited by John Scheirs, John Wiley & Sons LTD, 1997.

"Husky Oil, Inter-Office Memorandum Re: Coating Evaluation Test Tool Results", Sep. 1993.

Appendix A, Case Study: Rainbow Lake—Successful Coated Tubing Test and Application, Undated.

Appendix B, Technical Paper, Experimental and Theoretical Studies of Solids Precipitation From Reservoir Fluid, by F. B. Thomas, D. B. Benion, D. W. Bennion and B. E. Hunter, "The Journal of Canadian Petroleum Technology", Jan. 1992, vol. 31, No. 1.

J. J. C. Hsu, Deepstar CTR 3205-3 Coating Study, "Effect of Coatings on Wax Deposition Under Turbulent Flow Conditions", Report 97-0146D, Aug. 1997.

Publication of 7th International Conference on Petroleum Phase Behavior and Fouling, Asheville, North Carolina, Jun. 25-29, 2006.

* cited by examiner

COATED PIPES FOR CONVEYING OIL

BACKGROUND OF THE INVENTION

1. Field of the Invention

This invention relates to pipes that convey oil, such as oil well pipes and oil pipelines, and more particularly to coatings for the interior surface of such pipes.

2. Description of Related Art

Oil pipes for conveying large volumes of oil have two primary utilities, as down-hole pipes for conveying oil from underground deposits to the earth surface and as pipelines for the long distance transportation of oil across the earth surface. Such pipes are large and long, usually having an inner diameter of at least 2 in (5.08 cm) and length of at least 10 ft (3 m), more often at least 20 ft (6.1 m) and often a length of at least 30 ft (9.1 m). Such pipes are typically made from carbon steel for economy reasons, rather than expensive specialty metal alloys that better resist the corrosive entities in the crude oil. The corrosion is especially severe in the hot underground environment of the oil deposit from such materials as water, sulfur, sulfur dioxide, carbon dioxide, hydrogen sulfide, present in the oil typically making it acidic. These materials corrode the oil pipe even at relatively low temperatures of oil transportation; the long contact times with the oil pipeline interior surface provide the conditions for corrosion to occur. An additional problem arises from soluble organic material present in the oil at the high temperature of the oil deposit, such as asphaltenes and paraffin waxes and with soluble inorganic material, commonly referred to as scale and generally comprising calcite and/or barite, present in the oil or in the presence of salt water associated with the conveying of oil from underground deposits. These materials become insoluble as the oil cools, as occurs during the rise of the oil through the down-hole pipe to the earth surface. The resultant insoluble materials tend to plate out on the interior surface of the pipe, restricting the oil flow therethrough and eventually plugging the pipe. This also occurs during long distance conveying of the oil through pipelines. This requires the oil pipes to be cleaned out, during which time oil production or transportation, as the case may be, ceases.

It is known to line the interior surface of oil well pipes with a fluoropolymer, such as polytetrafluoroethylene (PTFE), for example, as disclosed in EP 0 1910 092 to Mannesman Akt. Such fluoropolymer linings present a non-stick surface to the oil. However, because of this non-stick property, these linings do not adhere to the interior surface of the pipe.

Thus, there remains a need for solving the problems of corrosion and pluggage occurring in oil conveying pipes.

BRIEF SUMMARY OF THE INVENTION

The present invention solves these problems by providing a lining to the interior surface of an oil well pipe. The lining is impermeable to salt water, as well as to the corrosive materials present in the oil. In addition, this lining presents a non-stick surface to the oil, whereby the insoluble organic materials present in the oil do not stick to the overcoat lining, and restriction of oil flow and pluggage is minimized or avoided.

The lining of the present invention either minimizes or eliminates (i) the deposition of asphaltenes, paraffin wax, and inorganic scale, so as to minimize or eliminate pluggage of the oil pipe and (ii) corrosion of the interior surface of the pipe. The reduction in deposition can be characterized by being at least 40%, preferably at least 50%, of at least one of asphaltenes, paraffin wax, and inorganic scale as compared to the interior surface of the pipe without the lining being present. Reductions of at least 60%, 70%, 80% and even at least 90% may be realized. Preferably these reductions apply to at least two of the deposition materials, and more preferably, to all three of them. While it is the primer layer that provides the adherence to the pipe, it is the non-stick surface of the overcoat, i.e., the exposed surface of the overcoat that prevents the sticking of asphaltenes, paraffin wax, and inorganic scale to the lining, to delay or prevent plugging of the oil pipe. The reduced deposition performance of the lined pipes of the present invention is in contrast to the result obtained for unlined pipes, as well as for epoxy resin-lined oil pipe, where surprisingly the deposition is greater than for the unlined pipe. This deposition reduction is accompanied by the added benefit of salt water impermeability as well as corrosion resistance, as compared to unlined oil pipe. The overcoat is impermeable to salt water, as well as to the corrosive materials present in the oil and presents a non-stick surface to the oil, whereby the insoluble organic materials present in the oil do not stick to the overcoat lining, and restriction of oil flow and pluggage is minimized or avoided. Because of its non-stick property, however, the overcoat does not adhere to the interior surface of the pipe after contaminants are removed from the interior surface of the pipe. The intervening primer layer provides adhesion both to the overcoat layer and to the interior surface of the pipe. The primer layer by itself does not provide sufficient non-stick character and impermeability to the corrosive materials present in the oil to protect the interior surface of the pipe from corrosion.

According to one embodiment of the present invention, the lining is adhered to the interior surface of the oil pipe. In addition, the lining has a surface exposed to the oil. The exposed surface consists of a perfluoropolymer, so as to provide a particularly good anti-stick properties. A perfluoropolymer may also be used as the primer layer. In this case, the presence of perfluoropolymer in the primer layer enables the overcoat to melt bond to the primer layer when they are heated.

According to another embodiment of the present invention, the lining comprises a primer layer adhered to the interior surface of the pipe, and an overcoat comprising a fluoropolymer disposed on top of the primer layer. The overcoat has an exterior surface exposed to the oil. The overcoat may preferably be a perfluoropolymer, and a perfluoropolymer may also be used as the primer layer. In this case, the presence of perfluoropolymer in the primer layer enables the overcoat to melt bond to the primer layer when they are heated.

According to a further embodiment of the present invention, there is provided an oil pipe having a lining comprising particles which form a mechanical barrier against permeation of water, solvents and gases to the pipe.

The oil pipe in accordance with the present invention will generally be large, e.g., have an inner diameter of at least 2 in (5.08 cm) and sometimes as large as 6 in (15.24 cm) and can be at least 10 ft (3 m) long and even at least 20 ft (6 m) long. The vastness of the interior surface of this pipe over which the fluoropolymer lining is unsupported except by adhesion to the interior surface of the pipe requires high integrity for the adhesion bond. Otherwise the varying conditions of temperature, pressure and even mechanical contacts can cause the lining to separate from the interior surface, leading to loss in corrosion and possibly even non-stick protection if the lining ruptures. It is a significant advantage of the present invention that the lining in accordance with the embodiments mentioned above provides the combination of attributes described above, i.e., reduction in deposition and salt-water impermeability, as well as corrosion resistance, over the large interior surface of the oil conveying pipe.

DETAILED DESCRIPTION OF THE INVENTION

The present invention is directed to an oil conveying pipe, having a lining adhered to the interior surface of the pipe. The lining has a surface exposed to the oil, and it is object of the present invention to provide characteristics to the lining of the present invention make it particularly suitable for contacting oil. Thus, as will become apparent below, various configurations of the lining are within the scope of the present invention. For example, the lining may comprise one layer or multiple layers. Alternatively, the lining may comprise a primer layer adhered to the interior surface of the pipe and an overcoat disposed on top of the primer layer, where the overcoat has a surface exposed to the oil. Preferably the overcoat is adhered to the primer layer. This latter embodiment will be referred to throughout this description as the primer layer/overcoat embodiment.

The oil conveying pipes used according to the present invention are conventional, and preferably made from metal, such as steel. According to the present invention, the pipes do not have to be rigid in the embodiment where a primer layer and a perfluoropolymer overcoat is used, but rather could be a flexible hose, which has, for example, subsea utility. The composition of the pipes is selected depending on whether the pipe is used in the oil well or to form an oil pipeline. In any event, the oil pipes are large. Inner diameters of 2 in (5.08 cm), 2⅜ in (6.03 cm) and 3 in (7.6 cm) and larger, and lengths of at least 10 ft (3 m), or even 20 ft (6.1 m) are quite common.

While the relative dimensions of the oil pipe are large, the thickness of the lining is quite small. In the primer/overcoat embodiment, the primer layer needs only to be thin enough to adhere the overcoat to itself and thereby to the interior surface of the oil pipe. The overcoat will generally be from about 51 to 6350 micrometers (2 to 250 mils) thick, with the same being true for the thickness of the lining in the first-mentioned embodiment above. The primer layer and overcoat coating thicknesses depend on how these layers are formed and on the thickness desired for the particular oil conveying pipe application. The primer layer preferably is no greater than 1 mil (25 micrometers) thick and the overcoat is preferably 2 to 250 mils (51 to 6350 micrometers) thick. In applications where thin coatings are desired, the thickness of the overcoat is preferably 2-7 mils (51-175 micrometers). In some applications, where thick coatings are preferred, the thickness of the overcoat is 25-250 mils (635-6350 micrometers), preferably 30-100 mils (762-2540 micrometers). Thick coatings are preferred in highly abrasive or in severely corrosive environments and the primer layer may have a thickness of at least 25 micrometers. There is of course an economical advantage to supplying thin coatings in applications which are determined to be less severe. The oil pipe of the present invention will be used as a succession of such pipes in an oil transportation pipeline or a down-hole oil well pipeline.

The interior surface of the oil pipe, as manufactured, is generally smooth but with peaks and valleys and is generally coated with preservative to minimize any rusting. Before forming the lining on the pipe interior surface, such surface should be treated to remove the preservative and any other contaminant. This removing step is aimed at providing a clean adherent surface for the overcoat layer to be adhered to the interior surface of the oil pipe, preferably using a primer layer to establish the rigorous bond needed between interior surface of the pipe and the overcoat, and between the primer layer and overcoat. In the present invention, the term adhered means that the lining would pass the Post Boiling Water Fingernail Adhesion (PWA) test and the cross-hatch adhesion test as set forth below.

Conventional soaps and cleansers can be used to remove the preservatives and contaminants. The pipe can be further cleaned by baking at high temperatures in air, temperatures of 800° F. (427° C.) or greater. The cleaned interior surface can then be roughened, such as by chemical etching or grit blasted with abrasive particles, such as sand, metal shot, or aluminum oxide, to form a roughened surface to which the primer layer of the coating can adhere. The grit blasting is sufficient to remove any rust that may be present, thereby supplementing the cleaning of the interior surface. The roughening that is desired for primer layer adhesion can be characterized as a roughness average of about 70-250 microinches (1.8-6.4 micrometers). The lining is formed on the interior surface of this treated pipe. The lining follows the peaks and valleys of the interior surface of the pipe and to some extent fills them in with the primer layer and the overcoat. In one embodiment the lining of the present invention consists of a perfluoropolymer. In a perfluoropolymer, the carbon atoms making up the polymer chain, if not substituted by oxygen, are substituted with fluorine atoms. The end groups of the perfluoropolymer may also be entirely fluorine substituted, but other relatively stable end groups, such as —$CF_2H$ and —$CONH_2$, may be present, especially in the fluoropolymer present in the primer layer. The perfluoropolymer used in the present invention is melt flowable at the baking temperature, which will generally be in the range of 300° C. to 400° C. Polytetrafluoroethylene, which has a melt viscosity of at least $10^8$ Pa·s at 372° C., would not be melt flowable.

The perfluoropolymers used in the primer layer and the overcoat are melt flowable fluoropolymers. Examples of such melt-flowable fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-8 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro (methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Typically these copolymers will have a melt flow rate of 1 to 100 g/10 min as determined by ASTM D-1238 and ASTM tests applicable to specific copolymers (ASTM D 2116-91a and ASTM D 3307).

Melt flowable polytetrafluoroethylene (PTFE), commonly referred to as PTFE micropowder, can also be present in the primer layer or the overcoat along with the melt-fabricable copolymers mentioned above, such micropowder having similar melt flow rate. Similarly, minor proportions of non-melt-fabricable PTFE can be present either in the primer layer or the overcoat, or both. In the primer layer the PTFE aids in stratification towards providing a pure perfluoropolymer in the primer at the primer/overcoat interface. PTFE in the overcoat aids in coating toughness, but should not be used in proportions that detract from the impermeability of the overall lining to corrosive fluids and the protection of the pipe interior surface provided by the lining. In either case, the primer layer and the overcoat, while being polymer blends with either PTFE or multiple melt-flowable perfluoropolymers, are still perfluoropolymers.

In the primer/overcoat embodiment, the overcoat comprises a fluoropolymer. The fluoropolymer could be, but need not be a perfluoropolymer. In this embodiment, the primer layer may also, but not necessarily, be comprise a perfluoropolymer. In this case, other materials may be used for the primer layer as long as they promote adhesion of the overcoat to the pipe.

The lining may be formed by a number of coating methods, such as application of liquid-based coating composition, application of powder coating, and/or rotolining. In the primer layer/overcoat embodiment, different coating methods may be used for the primer layer and the overcoat. Preferred coating methods include liquid-based coatings for the primer layer and the overcoat, or liquid-based coating for the primer layer and powder coating for the overcoat, or and liquid-based coating for the primer layer and rotolining for the overcoat. The coating is heated to form the lining on the surface of the pipe. The heating is optionally sufficient to bake the lining. This baking consolidates the lining from the dried liquid state or powder state to a solid film state. In the primer layer/overcoat embodiment, the primer layer is baked, and the thickness of the primer layer after baking is no greater than about 25 micrometers (1 mil). In this regard, the term "baking" is used in its broadest sense of achieving the aforesaid consolidation. Sometimes, the term "curing" is used to describe the film-forming effect; "curing" is included within the meaning of the term "baking". Typically, the baking is carried out by simply heating the lining sufficiently above the melting temperature of the material of the lining to cause the respective material to flow and fuse to become a film-like layer. This allows the overcoat to adhere to the primer layer. In the primer layer/overcoat embodiment, this consolidation will generally involve baking of both of the primer layer and the overcoat, either sequentially or simultaneously. Exemplary of the effect of the consolidation, in this embodiment, after the primer layer is baked and consolidated, the thickness of the primer layer after baking is no greater than about 25 micrometers (1 mil).

In the case of rotolining, the layer becomes film-like as it is formed. In the primer layer/overcoat embodiment, the primer layer may only need to be partly consolidated, such as by drying if applied as a liquid-based composition and possibly partially fused, with complete consolidation occurring upon baking of the overcoat.

The overcoat is impermeable to salt water, as well as to the corrosive materials present in the oil and presents a non-stick surface to the oil, whereby the insoluble organic materials present in the oil do not stick to the overcoat lining, and restriction of oil flow and pluggage is minimized or avoided. Because of its non-stick property, however, the overcoat does not adhere to the interior surface of the pipe after contaminants are removed from the interior surface of the pipe. The intervening primer layer provides adhesion both to the overcoat layer and to the interior surface of the pipe. The primer layer by itself does not provide sufficient non-stick character and impermeability to the corrosive materials present in the oil to protect the interior surface of the pipe from corrosion.

In one preferred embodiment where the total coating thickness is relatively thin, the overall coating thickness (primer layer thickness plus overcoat thickness) of the lining being no greater than 8 mils (203 micrometers), the interior surface of the pipe is provided with an adherent coating that presents a non-stick surface to the oil and provides a high degree of corrosion protection to the interior surface. In another preferred embodiment, the total coating thickness is relatively thick, the overall lining thickness (primer layer thickness plus overcoat thickness in the primer layer/overcoat embodiment) of the lining is at least 26 mils (660 micrometers).

To insure that a thin overcoat does not have pinholes through which corrosive material may pass to ultimately reach the interior surface of the pipe, the step of forming a lining is preferably carried out by applying multiple coats or layers, one top of one another, where, in the embodiment where the lining comprises a primer layer and an overcoat, the overall thickness of the overcoat is still no greater than 7 mils (175 micrometers), preferably no greater than 6 mils (150 micrometers) in the case of using either liquid-based or powder coating overcoat. The succeeding coating application of the liquid or powder overcoat composition will fill in any pinholes present in the preceding overcoat.

In the primer layer/overcoat embodiment, the liquid basis of the coating composition is preferably organic solvent, which avoids the creation of rust on the cleaned and roughened interior surface of the pipe. Rust would interfere with adhesion of the primer layer to the pipe interior surface The heating of the primer layer composition is sufficient to dry the composition to form the primer layer and may even be sufficient to bake the primer layer, prior to the formation of the overcoat. The liquid basis of the overcoat composition is preferably water, to minimize the need for solvent recovery. In the case of the liquid-based overcoat, following its application to the dried or baked primer layer, the overcoat is dried and then baked at a sufficiently high temperature, depending on the particular composition used, to melt the overcoat composition to be film forming and the composition of the primer layer as well if not already baked, bonding the primer layer to the overcoat. By "liquid-based" is meant that that the coating composition is in the liquid form, typically including a dispersion of perfluoropolymer particles in the liquid, wherein the liquid is the continuous phase. The liquid basis, i.e., the liquid medium can be water or organic solvent. In the case of forming the primer layer, the liquid basis is preferably organic solvent and in the case of the overcoat, the liquid basis is preferably water. Organic solvent may, for example, be present in the overcoat liquid composition in a much smaller amount, e.g., no more than 25% of the total weight of liquid, to improve wetting of the overcoat layer and thereby improve application properties.

When the primer composition is applied as a liquid medium, the adhesion properties described above will manifest themselves upon drying and baking of the primer layer together with baking of the next-applied layer to form the non-stick coating on the pipe. When the primer layer composition is applied as a dry powder, the adhesion property becomes manifest when the primer layer is baked.

In the primer layer/overcoat embodiment, the composition of the primer layer and the overcoat can be the same or different, provided that when baked together, they adhere to one another, and the primer layer adheres to the pipe. When the composition is the same, adequate intercoat adhesion is obtained. In a preferred embodiment, the primer layer and the overcoat both comprise perfluoropolymers. The perfluoropolymers in the primer layer and the overcoat are preferably independently selected from the group consisting of (i) copolymer of tetrafluoroethylene with perfluoroolefin copolymer, the perfluoroolefin containing at least 3 carbon atoms, and (ii) copolymer of tetrafluoroethylene with at least one perfluoro(alkyl vinyl ether), the alkyl containing from 1 to 8 carbon atoms. Additional comonomers can be present in the copolymers to modify properties. Adequate intercoat adhesion is also obtained when one of the perfluoropolymers is copolymer (i) and the other is copolymer (ii). The melting temperature of the lining will vary according to its composition. By melting temperature is meant the peak absorbance obtained in DSC analysis of the lining. By way of example, tetrafluoroethylene/perfluoro(propyl vinyl ether) copolymer (TFE/PPVE copolymer) melts at 305° C., while tetrafluoroethylene/hexafluoropropylene melts at 260° C. (TFE/HFP copolymer). Tetrafluoroethylene/perfluoro-(methyl vinyl ether)/perfluoro(propyl vinyl ether) copolymer (TFE/PMVE/PPVE copolymer) has a melting temperature in between these melting temperature. Thus, in one embodiment of the present invention, when the primer layer comprises TFE/PMVE/PPVE copolymer and the perfluoropolymer in the overcoat is TFE/HFP copolymer, the baking of the overcoat may not be at a high enough temperature to bake the primer layer, in which case the primer layer would be heated to the baked condition prior to applying the overcoat to the primer layer. Alternatively, the primer layer can contain the lower melting perfluoropolymer, in which case the baking of the overcoat would also bake the primer layer.

A preferred ingredient in the primer layer, whether the primer is liquid-based or a dry powder, is a heat resistant polymer binder, the presence of which enables the primer layer to adhere to the pipe interior surface. The binder component is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer.

Examples of the non-fluorinated thermally stable polymers include polyamideimide (PAI), polyimide (PI), polyphenylene sulfide (PPS), polyether sulfone (PES), polyarylene-etherketone, and poly(1,4(2,6-dimethylephenyl)oxide) commonly known as polyphenylene oxide (PPO). These polymers are also fluorine-free and are thermoplastic. All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyarylene-etherketones are thermally stable at least 250° C. and melt at temperatures of at least 300° C.

Examples of suitable powder coating compositions comprising perfluoropolymer and polymer binder, wherein these components are associated with one another in multicomponent particles are disclosed in U.S. Pat. Nos. 6,232,372 and 6,518,349.

The polymer binder can be applied as an undercoat to the pipe interior surface after treatment to remove contaminants and an organic solvent solution thereof, prior to application of the primer. The resultant dried thin film of polymer binder can further enhance the adhesion of the primer layer to the pipe interior surface.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS. Typically, the polymer binder content on the primer layer will be from 10-60 wt % based on the combined weight of the perfluoropolymer and polymer binder.

Other ingredients can be present in the primer, such as pigments, fillers, high boiling liquids, dispersing aids, and surface tension modifiers.

The lining composition can be applied to the interior surface of the pipe after removal of contaminants by spraying of the liquid-based composition or dry powder from a nozzle at the end of a tube extending into the interior of the pipe and along its longitudinal axis. The spraying starts at the far end of the pipe and is moved backward along its longitudinal axis as the spray applies the liquid-based coating, until the entire interior surface is coated. The tube having the spray nozzle at its end is supported along its length and positioned axially within the pipe by sled elements positioned along the length of the tube. As the tube and its nozzle is retracted from the pipe, the sled elements slide along the interior surface of the pipe, leaving the underlying interior surface open to receive the sprayed coating. The dry powder primer can be sprayed using an electrostatic sprayer; electrostatic spraying is conventional in the dry powder coating art.

The preferred liquid which enables the lining composition to be a liquid is one or more organic solvents, within which the perfluoropolymer, present as particles in the preferred embodiment, is dispersed and the polymer binder present either as dispersed particles or in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation.

The solvent should have a boiling point of 50 to 200° C., so as not to be too volatile at room temperature, but to be vaporized at reasonable elevated temperatures, less than the baking temperature of the perfluoropolymer. In the primer layer/overcoat embodiment, the thickness of the primer layer is established by experience with the particular primer composition selected and polymer binder concentrations and the relative amount of solvent that is present. Preferably the primer contains 40 to 75 wt % solvent based on the combined weight of solvent, polymer and polymer binder.

After application of the lining to the interior surface of the pipe, the tube and nozzle are removed and the pipe is subjected to a heating step to at least dry the lining to form the lining. Typically, the pipe will be placed in an oven heated to an elevated temperature to vaporize the solvent or to heat the pipe and its lining to a higher temperature, above the melting temperature of the material of the lining to bake the lining. In the primer layer/overcoat embodiment, it is the primer layer which is heated and baked in the described manner.

After the heating step, in the primer layer/overcoat embodiment, the overcoat is spray-applied as a liquid-based composition or as a dry powder onto the primer layer, using a tube supported by sled elements and nozzle similar to that used to apply the primer. It has been found that mere drying of the liquid-based primer to form the primer layer may give the layer adequate integrity to withstand, i.e., not be removed by the sliding of the sled elements across the primer layer surface as the tube/spray nozzle are retracted during spraying of the liquid-based overcoat. To accomplish multiple applications of the overcoat to the primer layer, the overcoat applied in one spray application is baked so that the subsequent spay application can be carried out without the sled elements scaring or otherwise removing overcoat from the preceding application.

In the case of the overcoat being a dry powder, the resultant powder coating should be baked before the next spray application of dry powder if greater coating thickness is desired.

One preferred embodiment for the process of the present invention can be described as the process for coating the interior surface of an oil-conveying pipe, comprising (a) cleaning said interior surface, (b) grit blasting said surface after said cleaning, (c) applying a liquid-based perfluoropolymer primer coating to said surface after said grit blasting, (d) heating said coating to form a primer layer on said surface, said heating optionally being sufficient to bake said primer layer, (e) applying a perfluoropolymer overcoat on said primer layer, and (f) baking said overcoat.

In an alternate embodiment, a powder overcoat is applied by rotolining. J. Scheirs, Modern Fluoropolymers, John Wiley & Sons (1997) describes the rotolining process, which involves the adding of sufficient fluoropolymer in powder form to a steel vessel to coat the interior surface of the vessel with the desired thickness of the fluoropolymer, followed by rotating the vessel in three dimensions in an oven, to melt the fluoropolymer, whereby the fluoropolymer covers the interior surface of the vessel and forms a seamless lining (p. 315). In the preferred method of this embodiment, the primer is heated sufficiently to both dry and bake the coating prior to rotolining. When the overcoat is a rotolining, the preferred thickness of the lining is 30-220 mils (762-5588 micrometers), preferably 30-100 mils (762-2540 micrometers).

EP 0 226 668B1 discloses the preparation of rotolining particles of TFE/perfluoroalkyl vinyl ether (PAVE) in which the vinyl ether comonomer contains 3 to 8 carbon atoms, disclosing particularly perfluoro(methyl vinyl ether), perfluoro(propyl vinyl ether), and perfluoro(heptyl vinyl ether). Such particles can be used in this invention. The TFE/PAVE copolymer particles used in the present invention can also be made by other processes, for example the melt extrusion of the copolymer and cutting of the extrudate into minicubes as disclosed in U.S. Pat. No. 6,632,902. The average particle size of the copolymer particles used for rotolining in the present invention is preferably about 100 to 3000 μm, more preferably about 400 to 1100 μm.

The rotolining method of forming the lining can be used to form both the primer and overcoat layers. When forming the primer, it is preferred that the perfluoropolymer primer composition also contain a finely divided metal additive such as Zn or Sn in an amount of about 0.2 to 1 wt % based on the combined weight of the metal powder and perfluoropolymer. This additive, in place of polymer binder, enables the rotolining primer to adhere to the pipe interior surface. Because it is more economical to form a thin primer layer by using a liquid-based primer composition, it is preferred that the rotolining technique be used for the formation of the overcoat layer, especially when a thick overcoat is desired, such as described above.

The overcoat can also be a liquid perfluoropolymer composition, i.e., powder particles having an average particle size of 2 to 60 micrometers dispersed or solubilized in an organic solvent or dispersed in aqueous media. However, the overcoat is preferably applied as a powder composition by means of known spray devices such as by electrostatic spraying. The overcoat does not require any ingredient therein to promote adhesion to the interior surface of the oil pipe, because the primer layer provides this adhesion and adhesion to the overcoat. Therefore the overcoat composition applied to the primer layer can be essentially free of any other ingredient, preferably providing a pure perfluoropolymer interior surface facing the oil in the oil pipe, to provide the best non-stick surface.

In another embodiment, the lining comprises a plurality of platelet shaped particles which form a mechanical barrier against permeation of water, solvents and gases to the pipe. In a preferred configuration of this embodiment, the lining comprises a primer layer and an overcoat, and the overcoat includes a multiple coating of a first-applied coating on the primer layer to form a lower layer of the overcoat composition containing a small amount of mica dispersed therein. This is followed by a subsequent applied coating on the overcoat/mica lower layer to form an overcoat upper layer that is free of mica. Each of these layers can be applied by powder coating.

Further details on the overcoat/mica composition is disclosed in U.S. Pat. No. 5,972,494, wherein it is disclosed that the mica constitutes 0.05 to 15 wt % of the liner, or 2 to 15 wt % of the lower layer of the overcoat, or 1 to 8% of the entire overcoat. For purposes of the present invention, these percents refer to the combined weight of the perfluoropolymer and the mica and the talc, if present. The presence of this lower layer further improves the impermeability performance of the lining when the corrosive conditions in particular oil wells require enhanced protection of the oil pipe.

According to the primer layer/overcoat embodiment of the present invention, the after the overcoat is applied, the resultant oil conveying pipe is then baked to melt the overcoat, again by placing the pipe in an oven heated to the desired temperature. Typically, the baking temperature applied to the overcoat through the thickness of the wall of the pipe and the primer layer, will be at least 20° C. above the melting point of the fluoropolymer, with the temperature and time of exposure being sufficient to bake the fluoropolymer. The same is true with respect to the baking of the primer layer.

In use, the pipes are assembled together, end to end, by conventional techniques dependent on the utility. For example, in oil wells, the pipes will typically have screw sections at each end so that length after length of coated pipe can be screwed together to reach the depth of the oil well. The lining will be applied to abutting ends of the screw threads so that when screwed together, the succession of pipes presents a continuous surface exposed to the oil. For oil pipelines, the pipes may have flanges for bolting together to form the continuous succession of pipes required. In that case, the coating of the interior surface of the pipe is extended to the surface of the flange so that the butting together of the flanges adds to the continuity of the coating on the interior surface of the pipes.

In the primer layer/overcoat embodiment, the overcoat is impermeable to salt water, as well as to the corrosive materials present in the oil and presents a non-stick surface to the oil, whereby the insoluble organic materials present in the oil do not stick to the overcoat lining, and restriction of oil flow and pluggage is minimized or avoided. Because of its non-stick property, however, the overcoat does not adhere to the interior surface of the pipe after contaminants are removed from the interior surface of the pipe. The intervening primer layer provides adhesion both to the overcoat layer and to the interior surface of the pipe. The primer layer by itself does not provide sufficient non-stick character and impermeability to the corrosive materials present in the oil to protect the interior surface of the pipe from corrosion.

The lining both acts as a non-stick surface for the oil and its constituents, but also to isolate the steel structure of the pipe from corrosion. In oil wells, temperatures at the bottom of the well can reach 500° F. (260° C.), but will more typically be in the range of 350-450° F. (177-232° C.). The materials of the lining are selected to have a melting temperature greater than the temperature present at the bottom of the well. The lining forms a physical barrier to the corrosive environment of the hot oil. The lining is also resistant to permeation of this corrosive environment through the thickness of the lining. The lining provides the effective permeation resistance. This same corrosion protection is provided to pipe used in a surface pipeline, where temperatures will be lower, but contact with the oil occurs for a long period of time.

With the present invention, corrosion resistance of the lining is quantified by autoclave permeation testing as further explained in the examples. The corrosion resistance is expressed as Log Z using Electrical Impedance Spectroscopy (EIS) on samples that have been suspended in an autoclave containing three phases: 1) an aqueous phase with a 5 wt % aqueous solution of NaCl, 2) an organic phase with 50 volume % kerosene and 50 volume % toluene, and 3) a gas phase with 5 volume % hydrogen sulfide ($H_2S$), 5 volume % carbon dioxide ($CO_2$) and 90 volume % methane ($CH_4$), which is maintained at approximately 251° F. (122° C.) and approximately 1026 psi (70.8 MPa) wherein at least a portion of the lining is exposed for 29 days. Under such conditions, Log Z is greater than about 6. EIS is a well-known means for evaluating permeability of a coating or lining to corrosive services. Ratings of this magnitude indicate the anticipation of very good to excellent coating service life. In successively preferred embodiments of the invention, Log Z is determined to be greater than about 7.5, greater than about 8, greater than about 8.5, greater than about 9, greater than about 9.5, greater than about 10, greater than about 10.5. In an especially preferred embodiment Log Z is in the range of about 7.5 to about 12.

With the present invention, the reduction in deposition can be characterized by being at least 40%, preferably at least 50% of at least one of asphaltenes, paraffin wax, and inorganic scale as compared to the interior surface of the pipe without the lining being present. These reductions are also made in comparison to pipe lined with an epoxy resin. In fact, reductions of at least 60%, 70%, 80% and even at least 90% have been realized. Preferably these reductions apply to at least two of the deposition materials, and more preferably, to all three of them. Thus, in accordance with the present invention, there is also provided a method for reducing the deposition in a rigid oil well pipe of at least one of asphaltenes, paraffin wax, and inorganic scale by at least 40% as compared to the interior surface of said oil pipe without the lining being present.

These reductions are determined by the Asphaltene Deposition Test, the Paraffin Deposition Test, and the Inorganic Scale Deposition Test, respectively, disclosed in the Examples. Even better results than shown by these model Tests are expected because of the rapid flow of oil through the oil pipe in field use. The corrosion protection imparted by the lining to the interior surface of the oil pipe can be characterized by substantial impermeability to a strong salt solution at a high temperature for a long period of time in accordance with the Salt Water Permeation Test described in the Examples below.

TEST METHODS

Paraffin Deposition Test

A cold finger apparatus, available at Westport Technology Center International (Houston, Tex.) is used to test the baked coatings as prepared in the Examples for the degree of release (non-stick) they exhibit. The apparatus includes a circulating beaker (double-walled) filled with mineral oil and connected to a first temperature bath which is placed on a magnetic mixing plate. A stainless steel cup with a magnetic stirring bar is submerged in the mineral oil and the temperature set to 140° F. (60° C.). A cold finger (tubular projection) is connected to a second water circulating temperature bath, and the temperature set to 60° F.

Stainless steel sleeves (6" long, 0.5" inside ID, 0.625" OD) closed flat at the bottom which are coated as described in the Examples are washed with solvent (toluene, then methanol) and placed in a hot oven to ensure a clean surface for wax to deposit on. The sleeve is then weighed, secured over the finger with a set screw at the top to create a tight fit, and allowed to cool for thirty minutes. After thirty minutes, the sleeve is attached over the cold finger in a tight fit and submerged in the crude oil for twenty-four hours.

Crude oil known to have a large wax content with a wax appearance temperature of approximately 105° F. is used for this test. The crude is initially heated to 150° F. (66° C.) and centrifuged twice to remove any water and sediments. The source sample of crude was maintained at 150° F. (66° C.) during the duration of the testing to ensure the wax remained in solution.

At the completion of the twenty-four hour test time, the sleeve is removed from the crude and allowed to sit for one hour at 60° F. (16° C.) in a nitrogen environment. A final weight is measured. Weight data collected before and after submersion are used to calculate the wax deposition on the sleeve. From the material balance a mass per unit area was calculated for comparison purposes. The baseline for comparison is the paraffin adhesion test performed on commercially available epoxy-resin coated oil pipe, wherein the deposition of paraffin on the epoxy resin coating amounted to 0.0652 g/cm$^2$.

Adhesion Tests

Test panels of cold rolled steel 4.0"×12.0" (10.1 cm×30.5 cm) panels are cleaned with an acetone rinse. The panel has a grit blast surface. The panels are coated according to the description in each of the examples. The panels are subjected to the following two adhesion tests.

(1) Post Boiling Water Fingernail Adhesion (PWA)

Coated test panels are submerged in boiling water for 20 minutes. The water is allowed to come to a full boil after inserting the coated panel, before timing is begun. After the boiling water treatment, the panel is cooled to room temperature and dried thoroughly. The fingernail scratch test involves the use of the fingernail, to chip or peel away the coating from the edge of a deliberate knife scratch in the film, to test the degree of adhesion of the film. If the coating can be pulled away from the substrate for 1 cm or more, the coating is considered to fail the PWA test. If the coating cannot be pulled loose for a distance of 1 cm, the coating is considered to pass the PWA test.

(2) Cross-Hatch Adhesion

Coated substrates are subjected to a cross-hatch (x-hatch) test for adhesion. The coated sample is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares. The coated and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing the test requires that no squares be removed from the 100-square grid.

EXAMPLES

In the following Examples, substrates for coating are cleaned by baking 30 min @ 800° F. (427° C.) and grit blasted with 40 grit aluminum oxide) to a roughness of approximately 70-125 microinches Ra. Liquid coatings are applied by using a spray gun, Model Number MSA-510 available from DeVilbiss located in Glendale Heights, Ill. Powder coatings are applied by using Nordson manual electrostatic powder spray guns, Model Versa-Spray I located in Amhearst, Ohio.

For determining the degree of release of the coatings, the substrate being coated is a stainless steel sleeve suitable for use in the apparatus described above in the Paraffin Deposition Test.

For determining the adhesion quality, the substrate being coated is a carbon steel panel suitable for use in the PWA Test and the Cross-Hatch Adhesion Test described above.

The primer layers formed in the Examples have the following pre-bake compositions:

TABLE 1

Liquid Primers

| Ingredient | Primer 1 Wt % | 2 wt % | 3 wt % |
|---|---|---|---|
| Fluoropolymer | | | |
| FEP | 12.5 | | 10.9 |
| ETFE | | 20.7 | |
| Polymer binder | | | |
| Polyamideimide | 1.1 | 3.7 | 11.9 |
| Polyethersulfone | 7.6 | | |
| Polyphenylene Sulfide | | 3.4 | |
| Solvents | | | |
| NMP* | 47.8 | 1.9 | 40.7 |
| Other Organics** | 20.1 | 4.7 | 32.0 |
| Water | | 60.2 | |
| Pigments | 9.9 | 4.2 | 1.7 |
| Dispersing Agent | 1.0 | 1.2 | 2.8 |
| Total | 100 | 100 | 100 |

*NMP is N-methyl-2-pyrrolidone
**Other organics may include solvents such as MIBK (methyl isobutyl ketone), hydrocarbons such as heavy naphtha, xylene etc., furfuryl alcohol, triethanol amine or mixtures thereof.
FEP: TFE/HFP fluoropolymer containing 11-12.5 wt % HFP, an average particle size of 8 micrometers and a melt flow rate of 6.8-7.8 g/10 min measured at 372° C. by the method of ASTM D-1238.
ETFE: E/TFE/PFBE fluoropolymer containing 19-21 wt % ethylene and 3-4.5 wt % PFBE having average particle size of 8 micrometers and a melt flow rate of 6-8 g/10 min measured at 298° C. by the method of ASTM D-1238.

The overcoat layers formed in the Examples have the following pre-bake compositions:

TABLE 2

Powder Overcoats

| Ingredient | Overcoat A wt % | B wt % | 1 wt % | 2 wt % |
|---|---|---|---|---|
| Epoxy | 100 | | | |
| ETFE | | 100 | | |
| Perfluoropolymers | | | | |
| PFA | | | | |
| FEP | | | | |
| PFA Fluorinated | | | | 100 |
| PFA Modified PEVE | | | 100 | |
| Stabilizer (Zn) | | | | |
| Total | 100 | 100 | 100 | 100 |

| Ingredient | Overcoat 4 wt % | 5 wt % | 6 wt % |
|---|---|---|---|
| Epoxy | | | |
| ETFE | | | |
| Perfluoropolymers | | | |
| PFA | 99.2 | 100 | |
| FEP | | | 100 |
| PFA Fluorinated | | | |
| PFA Modified PEVE | | | |
| Stabilizer (Zn) | 0.8 | | |
| Total | 100 | 100 | 100 |

FEP: TFE/HFP fluoropolymer resin containing 11-12.5 wt % HFP having a melt flow rate of 6.8-7.8 g/10 min and an average particle size of 35 micrometers.
PFA: TFE/PPVE fluoropolymer resin containing 3.8-4.8 wt % PPVE having a melt flow rate of 10-17 g/10 min and an average particle size of 35 micrometers.
PFA modified with PEVE: TFE/PPVE/PEVE fluoropolymer resin containing 6.8-7.8 wt % PEVE prepared according to the teachings of U.S. Pat. No. 5,932,673 (Aten et al./DuPont) having a melt flow rate of 13-18 g/10 min and an average particle size of 8 micrometers.
PFA Fluorinated: TFE/PPVE fluoropolymer resin containing 3.8-4.8 wt % PPVE prepared according to the teachings of U.S. Pat. No. 4,743,658 (Imbalzano et al./DuPont) having a melt flow rate of 12-20 g/10 min and an average particle size range of 25 micrometers.
PFA: TFE/PPVE fluoropolymer resin containing 3.8-4.8 wt % PPVE having a melt flow rate of 10-17 g/10 min and an average particle size of 35 micrometers.

TABLE 3

Liquid Overcoat

| Ingredient | Overcoat 3 wt % |
|---|---|
| Perfluoropolymer PFA | 45.0 |
| Other Organics | 0.6 |
| Water | 43.8 |
| Thickener | 10.1 |
| Dispersing Agents | 0.5 |
| Total | 100 |

TABLE 4

Liquid Midcoat

| Ingredient | Midcoat 1 wt % |
|---|---|
| Perfluoropolymer PFA | 41.2 |
| Glycerine | 8.3 |
| Water | 42.8 |

TABLE 4-continued

Liquid Midcoat

| Ingredient | Midcoat 1 wt % |
|---|---|
| Red Mica | 3.9 |
| Thickener | 1.1 |
| Dispersing Agents | 0.4 |
| Other Organics | 1.1 |
| Tin Metal | 1.2 |
| Total | 100.0 |

TABLE 5

Commercial Coatings

1 - Impreglon 220M - Composition is indicated to include red pigment, polyether sulfone (PES), fluorinated ethylene propylene resin and various solvents. The formulation is proprietary so the ratios of the ingredients are not known.

The baking conditions are set forth in the Examples. Good adhesion of the primer layer to the substrate and of the primer layer to the overcoat layer is indicated by their performance in the PWA Test and the Cross-Hatch Adhesion Test.

The non-stick characteristic of the baked coatings in the Examples are confirmed by subjecting the coatings to the paraffin deposition test as described above. The baseline for comparison is the paraffin deposition test performed on commercially available epoxy-resin coated oil pipe, wherein the deposition of paraffin on the epoxy resin coating amounted to 0.0652 g/cm². The examples of this invention all have coatings with a wax deposition below that of standard epoxy resin coating.

Comparative Example A

Epoxy Standard

A layer of coating A (epoxy powder) is applied to a prepared stainless steel sleeve, followed by baking at 316° C. for 20 minutes. The dry film thickness (DFT) of the paint layer is 100-125 micrometers. When the coated sleeve is subjected to the Paraffin Deposition Test, a deposition of 0.0652 g/cm² is obtained.

Comparative Example B

ETFE Primer/ETFE Overcoat

A layer of primer 2 (aqueous ETFE) is applied to a prepared stainless steel sleeve and a prepared carbon steel panel, followed by baking at 150° C. for 10 minutes. The dry film thickness (DFT) of the primer layer is 12-19 micrometers (µ). A layer of overcoat B (powder ETFE) is applied over the dried primer layer. It is baked at 316° C. for 20 minutes. The total DFT is 100-125 micrometers and the total thickness of the overcoat is 81-113 micrometers. When the coated sleeve is subjected to the Paraffin Deposition Test, a deposition of 0.0327 g/cm² is obtained. When the coated carbon steel panel is subjected to the PWA test and Cross-Hatch Adhesion Test, the panel passes both tests.

Aqueous primers are not preferred for use in this invention because of the potential for reduced corrosion resistance over a prolonged period of time. ETFE overcoats are inferior to the perfluoropolymer overcoats of this invention.

Comparative Example C

Uncoated Substrate

An uncoated prepared stainless steel sleeve is subjected to the Paraffin Deposition Test, a deposition of 0.0296 g/cm² is obtained.

Example 1

FEP Primer/Modified PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 1 (PFA modified with PEVE powder) is applied over the dried primer layer. It is baked at 399° C. for 20 minutes. The total DFT is 60-75 micrometers. A second layer of overcoat 1 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0168 g/cm² is obtained. When the coated carbon steel panel is subjected to the PWA test and Cross-Hatch Adhesion Test, the panel passes both tests.

Example 2

FEP Primer/Fluorinated PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 2 (fluorinated PFA powder) is applied over the dried primer layer. It is baked at 399° C. for 20 minutes. The total DFT is 60-75 micrometers. A second layer of overcoat 2 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0145 g/cm² is obtained. When the coated carbon steel panel is subjected to the PWA test and Cross-Hatch Adhesion Test, the panel passes both tests.

Example 3

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 3 (PFA liquid) is applied over the dried primer layer. It is baked at 399° C. for 20 minutes. The total DFT is 60-75 micrometers. A second layer of overcoat 3 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0124 g/cm² is obtained. When the coated carbon steel panel is subjected to the PWA test and Cross-Hatch Adhesion Test, the panel passes both tests.

Example 4

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 4 (PFA powder) is applied over the dried primer layer. It is baked at 399° C. for 20 minutes. The total DFT is 60-75 micrometers. A second layer of overcoat 4 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0124 g/cm² is obtained. When the coated carbon steel panel is subjected to the PWA test and Cross-Hatch Adhesion Test, the panel passes both tests.

Example 5

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 5 (PFA powder) is applied over the dried primer layer. It is baked at 399° C. for 20 minutes. The total DFT is 60-75 micrometers. A second layer of overcoat 5 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0116 g/cm² is obtained. When the coated carbon steel panel is subjected to the PWA test and Cross-Hatch Adhesion Test, the panel passes both tests.

Example 6

FEP Primer/FEP Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 6 (FEP powder) is applied over the dried primer layer. It is baked at 399° C. for 20 minutes. The total DFT is 60-75 micrometers. A second layer of overcoat 6 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0110 g/cm² is obtained. When the coated carbon steel panel is subjected to the PWA test and Cross-Hatch Adhesion Test, the panel passes both tests.

Example 7

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 5 (PFA powder) is applied over the dried primer layer. It is baked at 399° C. for 20 minutes. The total DFT is 60-75 micrometers. A second layer of overcoat 5 is applied. It is baked at 371° C. for 20 minutes. Additional layers of overcoat 1 are applied and baked at 343° C. for 20 minutes until the total DFT is 950-1050 micrometers and the total thickness of the overcoat is 931-1038 micrometers. When the coated sleeve is subjected to the Paraffin Deposition Test, a deposition of only 0.0098 g/cm² is obtained. When the coated carbon steel panel is subjected to the PWA test and Cross-Hatch Adhesion Test, the panel passes both tests.

Example 8

FEP/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 2 is applied over the dried primer layer. It is baked at 399° C. for 20 minutes. The total DFT is 60-75 micrometers. A second layer of overcoat 2 (fluorinated PFA) is applied. It is baked at 371° C. for 20 minutes. Additional layers of overcoat 4 are applied and baked at 343° C. for 20 minutes until the total DFT is 950-1050 micrometers and the total thickness of the overcoat is 931-1038 micrometers. When the coated sleeve is subjected to the Paraffin Deposition Test, a deposition of only 0.0042 g/cm² is obtained. When the coated carbon steel panel is subjected to the PWA test and Cross-Hatch Adhesion Test, the panel passes both tests.

Example 9

FEP Primer/PFA Overcoat

A layer of primer 3 (liquid FEP) is applied to a prepared stainless steel sleeve and a prepared carbon steel panel, followed by baking at 150° C. for 10 minutes. The dry film thickness (DFT) of the primer layer is 8-12 micrometers. A layer of overcoat 2 (fluorinated PFA) is applied over the dried primer layer. It is baked at 399° C. for 20 minutes. The total DFT is 60-70 micrometers. A second layer of overcoat 2 (fluorinated PFA) is applied. The total DFT is 80-110 micrometers and the total thickness of the overcoat is 68-102 micrometers. It is baked at 371° C. for 20 minutes. When the coated sleeve is subjected to the Paraffin Deposition Test, a deposition of only 0.0042 g/cm² is obtained. When the coated carbon steel panel is subjected to the PWA test and Cross-Hatch Adhesion Test, the panel passes both tests.

Example 10

FEP Primer/PFA Rotolined Overcoat

A carbon steel pipe suitable for conveying oil having a diameter of 3 inches (7.6 micrometers) and a length of 30 feet (9 m) is cleaned by baking 30 min @ 800° F. (427° C.) and grit blasted with 40 grit aluminum oxide to a roughness of approximately 70-125 microinches Ra. A layer of primer 1 is applied to the interior of the pipe, followed by baking at a temperature of 750° F. (399° C.) for five minutes to dry and fully bake (cure) the primer. The dry film thickness (DFT) of the primer layer is 8-12 micrometers. The primed pipe is rotolined with a composition containing a commercially available copolymer of TFE/PPVE powder having an MFR of 6 g/10 min and an average particle size of 475 µm that has been stabilized (fluorinated according to the teachings of U.S. Pat. No. 4,743,658 Imbalzano et al./DuPont). The powder composition is introduced to the interior of the pipe to be rotolined in the amount sufficient to obtain an overcoat lining thickness of 30 mils (762 micrometers). The pipe is temporarily closed at both ends and mounted on a mechanism that both rocks and rotates the pipe within in an air oven. The mechanism is commercially available as a Rock and Roll machine. The pipe is heated above the melting point of the copolymer particles of the overcoat and is rotated around its longitudinal axis during the heating while being rocked from end to end during the rotation at a temperature 740° F. (380° C.) for 120 min of pipe rotation. Despite, the long exposure to high temperature, the primer is surprisingly not degraded and still functions to adhere the coating to the pipe's interior. The pipe is rotated in an air oven resulting in lining the interior surface of the pipe with a coating of uniform distribution. Upon completion of the rotolining process, the oven is cooled and the rotolined pipe is examined for the quality of the rotolining. The temporary ends are removed from the pipe and the bubble-free quality of the lining is determined by observation of the lining with the naked eye. The lining is considered bubble free when no bubbles are visible within the lining thickness and the surface of the lining is smooth, i.e. free of voids, lumps, and craters.

For determining the adhesion quality, the coated pipe is sectioned and subjected to the PWA Test and the Cross-Hatch Adhesion Test as described above, except only an "X" is scribed in the Cross Hatch Test instead of a grid. The pipe sections tested herein pass the PWA test and no lining is removed with the Cross Hatch Test.

Example 11

Inorganic Scale Deposition Test

A number of the overcoats (FEP and PFA) from the foregoing Examples were subjected to coupon immersion testing in brine solutions in order to determine the reduction in inorganic scale deposition of the coated coupon, with the result being that scale deposition was reduced by more than 50 wt % as compared to the uncoated coupons. These tests were done by soaking coated and uncoated steel coupons in calcite and barite brine solutions having the following compositions:

| Brine A | g/kg water | Brine B | g/kg |
|---|---|---|---|
| $CaCl_2 \cdot 2H_2O$ | 36.87 | same | 8.6 |
| KCl | 11.43 | same | 4.38 |
| $MgCl_2 \cdot 6H_2O$ | 1.8 | same | 0.41 |
| NaCl | 138.9 | same | 89.09 |
| $Na_2SO_4$ | 0.32 | — | — |
| — | — | $BaCl_2$ | 3.08 |

The coupons were suspended for two days under 100 psi (6.9 MPa) pressure in either in Brine A heated at 140° F. (60° C.) or in Brine B heated at 90° F. (32° C.) and the weight pickups (scale deposition) for the coated coupons were compared to that for the uncoated steel coupons to reveal the reduction in scale deposition for the coupons coated with linings of the present invention.

Example 12

Asphaltene Deposition Test

Asphaltene is a mixture of amorphous high molecular weight, polynuclear aromatic compounds, containing C, H, O, N, and S, and often metals such as V or Ni. Asphaltene is soluble in oil, but becomes insoluble with drop in pressure, change in pH, or solvency change such as occurs in oil pipe utility. Asphaltene deposition can be measured by the flow loop method as practiced by the Petroleum Research Center located at the New Mexico Institute of Mining and technology in Socorro, N. Mex. Briefly, the material to be tested is formed into a loop and oil is flowed through the loop under conditions to cause the asphaltene in the oil to become insoluble, so that it has a chance to deposit on the interior surface of the loop. The deposition of asphaltene is determined by weighing the loop after the flow experiment is completed, comparing such weight with the weight of the loop before the flow test. In greater detail, the loop being tested is a tube that 100 ft (30.5 m) long and has an interior diameter of 0.03 in (0.75 mm) and is made of either one of the overcoat perfluoropolymers disclosed in the foregoing Examples or of steel. The tube is formed into a coil (loop), like a spring, so that it will fit into a water bath maintained at 60° C. A 50/50 vol % mixture of asphaltene-containing oil and n-pentadecane solvent is metered through the loop at a rate of 0.24 ml/hr for 24 hrs. The oil tested had the following characteristics: API gravity of 28.8°, viscosity of 30cP at 20°, and was composed of 51.1% saturates, 28.3% aromatics, 14.5% resins, 6.1% asphaltenes and contained 19 ppm Ni and 187 ppm V. For the uncoated steel loop, the weght gain from deposited asphaltene is 0.51 g, while for FEP and the fluorinated PFA of Example 8, there is no weight gain, indicating the effectiveness of the perfluoropolymer to reduce asphaltene deposition.

Example 13

Salt Water Permeation Test

This test is conducted to determine the salt water permeability of perfluoropolymers as compared to epoxy resin by exposing 5 mil (127 micrometers) thick coatings of these materials on steel coupons to salt water under severe conditions and subjecting the so-exposed coupons to the well-known Log Z-Electrical Impedance Spectroscopy. Impedance of the coating before and after the exposure is compared. A reduction in impedance indicates the permeability of the coating. In greater detail, the coated coupons are suspended in an autoclave having: 1) an aqueous phase with a 5 wt % aqueous solution of NaCl, 2) an organic phase with 50 volume % kerosene and 50 volume % toluene, and 3) a gas phase with 5 volume % hydrogen sulfide ($H_2S$), 5 volume % carbon dioxide ($CO_2$) and 90 volume % methane ($CH_4$), which is maintained at approximately 251° F. (122° C.) therein in contact with a portion of the coating. The autoclave is maintained at 251° F. (122° C.) and 1026 psi (70.8 MPa) for 29 days. The impedance of the coating is measured (before and after salt water exposure) using an electrochemical cell consisting of the coated coupon, a reference electrode, and an inert counter electrode. The electronic measuring equipment consists of a potentiostat, a frequency response analyzer and a computer with electrical impedance spectroscopy software. Impedance of the coating is measured as a function of the frequency of the applied AC voltage. The frequency ranges from 0.001 to 100 kHz. The resulting data is presented in the form of a Bode plot, consisting of Log Z plotted versus Log f, where Z is the impedance in ohms cm and f is frequency in Hertz. The comparison in impedance results is taken a 0.1 of the Bode plot, as follows:

| Coating | Log Z impedance | |
|---|---|---|
| | Before Exposure | After Exposure |
| PFA | 11.0 | 10.9 |
| FEP | 11.0 | 11.0 |
| Epoxy | 10.8 | 7.1 |

Tests of a one-coat system of FEP/PES which could only be applied to a thickness of 2 mils, are subjected to the same Autoclave conditions, and result in a Log Z impedance before exposure of 9.4, and after exposure, of 5.8.

The 34% decrease in impedance for the epoxy resin coating represents a substantial permeability of this coating to the salt water, and indeed the coating had blistered in places from the underlying steel coupon. In contrast, the impedance of perfluoropolymer coatings with no binder is substantially unchanged and there is no separation (no blistering) of the coating from the steel coupon, indicating substantial impermeability of these coatings to the salt water. This substantial impermeability can therefore be characterized by the absence of coating separation of the coating from the steel coupon or quantitatively by the reduction in Log Z impedance of less than 10%, preferably less than 5%. When the coated coupons are subjected to $H_2S$ gas and methane/toluene liquid mixture in the same autoclave under the same conditions as the salt water testing, no change in the coatings is noticed, indicating the greater severity of the salt water exposure.

Example 14

Single Layer Coating

Primer 1 is used a single layer coating on the coupon and tested as set forth in Example 11. Despite the presence of non-fluorine containing polymer binder (polyamideimide and polyether sulfone) in the primer composition, the deposition of inorganic scale on the coating is much less than for the bare steel coupon and about the same as for the FEP overcoat.

What is claimed is:

1. A pipe used in the production or transportation of oil comprising a metal pipe and a lining exposed to oil, said lining comprising a primer layer adhered to the interior surface of the pipe, and an overcoat disposed on top of said primer layer, wherein said overcoat comprises multiple layers including a lower layer and an upper layer, where said upper layer has an exterior anti-stick surface exposed to the oil and consists essentially of baked perfluoropolymer, said lining thereby reducing the deposition of paraffin wax, as compared to the interior surface of said pipe without said lining being present, so as to avoid pluggage of said pipe, wherein said overcoat is applied as a liquid based composition.

2. The pipe of claim 1 wherein said lining further reduces the deposition of asphaltenes as compared to the interior surface of said oil pipe without said lining being present.

3. The pipe of claim 1 wherein said lining further reduces the deposition of inorganic scale as compared to the interior surface of said oil pipe without said lining being present.

4. The pipe of claim 1, 2, or 3 wherein said lower layer of said overcoat comprises a plurality of particles which form a mechanical barrier against permeation of water to the pipe.

* * * * *